United States Patent [19]
Miyahara

[11] Patent Number: 6,116,587
[45] Date of Patent: Sep. 12, 2000

[54] VIBRATION-PROOF MOUNT

[75] Inventor: Tetsuya Miyahara, Tochigi-ken, Japan

[73] Assignee: Honda Giken Kogyo Kabushiki Kaisha, Tokyo, Japan

[21] Appl. No.: 09/086,954

[22] Filed: May 29, 1998

[30] Foreign Application Priority Data

Jun. 11, 1997 [JP] Japan ..................................... 9-153958

[51] Int. Cl.$^7$ ...................................................... F16F 7/10
[52] U.S. Cl. ...................................................... 267/140.12
[58] Field of Search ................................... 188/378, 379; 267/140.11, 140.12, 140.13, 140.14; 248/562, 635, 636

[56] References Cited

U.S. PATENT DOCUMENTS

| | | | |
|---|---|---|---|
| 5,178,376 | 1/1993 | Hamaekers et al. | 267/140.12 |
| 5,509,643 | 4/1996 | Carstens et al. | 267/140.12 |
| 5,769,399 | 6/1998 | Fiedler | 267/140.13 X |
| 5,895,031 | 4/1999 | Meyer et al. | 267/140.12 |
| 5,927,697 | 7/1999 | Miyamoto et al. | 267/140.12 |

*Primary Examiner*—Robert J. Oberleitner
*Assistant Examiner*—Pamela J. Lipka
*Attorney, Agent, or Firm*—Armstrong, Westerman, Hattori, McLeland & Naughton

[57] ABSTRACT

A clearance which is not filled with a vibration-proof member is provided between an inner cylinder and an outer cylinder. A stopper member which is made of an elastic member is disposed in this clearance. When the amount of relative displacement, in the diametrical direction, of the inner and outer cylinders has exceeded a predetermined value, the stopper member is elastically deformed. A clearance in the axial direction is secured between the stopper member and that portion of the vibration-proof member which connects the inner cylinder and the outer cylinder. In this manner, a function of switching the spring constant can also be obtained in a solid type of mount without a perforation in the vibration-proof member which is made of an elastic member to connect the inner cylinder and the outer cylinder.

2 Claims, 3 Drawing Sheets

VIBRATION-PROOF MOUNT

BACKGROUND OF THE INVENTION

1. Field of the Invention

The present invention relates to a vibration-proof mount (or mounting, or mounting element) for use in supporting a driving source of a vehicle on a vehicle body.

2. Description of the Related Art

Conventionally, this kind of vibration-proof mount is made up of an inner cylinder, an outer cylinder and a vibration-proof member such as rubber, or the like, which connects the inner cylinder and the outer cylinder. One of the inner cylinder and the outer cylinder is connected to the vehicle body and the other thereof is connected to the driving source.

In this kind of vibration-proof mount, there is also known one in which axial perforations are formed in the vibration-proof member. In this conventional vibration-proof mount, the spring constant of the vibration-proof mount becomes small until the perforation is crushed, with the result that the fine or small vibrations can be efficiently absorbed. Once the perforations have been crushed, the spring constant of the vibration-proof mount becomes large, with the result that large vibrations can also be effectively absorbed.

However, in the case of the vibration-proof mount for an electric motor which serves as the driving source of an electric vehicle, the perforations cannot be formed in the vibration-proof member in view of the frequencies of the vibrations which are generated in the electric motor.

In view of the above point, the present invention has an object of providing a vibration-proof mount in which a function of switching the spring constant can be obtained even in such a solid type of vibration-proof mount that perforations are not formed in a vibration-proof member.

SUMMARY OF THE INVENTION

In order to attain the above and other objects, the present invention is a vibration-proof mount comprising: an inner cylinder; an outer cylinder; a vibration-proof member, made of an elastic material, for connecting the inner cylinder and the outer cylinder; wherein the vibration-proof member is formed in a shape to connect said inner cylinder and the outer cylinder in an axially limited portion such that a space is provided in an axially remaining portion between the inner cylinder and the outer cylinder; a stopper member which is made of an elastic material, the stopper member being disposed in the space such that, when the inner cylinder and the outer cylinder have relatively displaced in a diametrical direction beyond a predetermined value, the stopper member is elastically deformed.

According to this arrangement, only the vibration-proof member elastically deforms until the amount of relative displacement, in the diametrical direction, between the inner cylinder and the outer cylinder reaches the predetermined value. Once the amount of relative displacement has exceeded the predetermined value, the stopper member, in addition to the vibration-proof member, also elastically deforms. Therefore, in a region in which the amount of relative displacement is below the predetermined value, the spring constant of the mount becomes small, whereby small vibrations can be efficiently absorbed. In a region in which the amount of relative displacement is above the predetermined value, the spring constant of the mount becomes large, whereby large vibrations can also be effectively absorbed.

The vibration-proof member tends to expand in the axial direction due to compression in the diametrical direction. If this expansion is restricted, the spring constant of the vibration-proof member increases, whereby the ability to absorb the small vibrations becomes poor. Therefore, it is preferable to secure a first axial clearance between the stopper member and that portion of the vibration-proof member which connects the inner cylinder and the outer cylinder. In this arrangement, while the amount of relative displacement, in the axial direction, between the inner cylinder and the outer cylinder is small, only the vibration-proof member elastically deforms in the axial direction. Once the amount of this relative displacement has exceeded the width of the above-described clearance, the vibration-proof member comes into abutment with the stopper member, whereby the stopper member also elastically deforms in the axial direction. Therefore, there can be obtained a function of switching the spring constant in the axial direction of the vibration-proof mount, with the result that the capability of absorbing the vibrations in the axial direction can be improved.

Further, if an arrangement is made that the stopper member further comprises a flange portion which abuts an axial end of the outer cylinder and that the flange is formed such that a second axial clearance is secured between the flange and a bracket which pivotally mounts the inner cylinder, the flange portion advantageously functions as a stopper to prevent the outer cylinder from excessively deforming, relative to the inner cylinder, in the axial direction of the vibration-proof mount. In case the first axial clearance is secured between the stopper member and that portion of the vibration-proof member which connects the inner cylinder and the outer cylinder, the width of the second axial clearance is made larger than the axial width of the first clearance. According to this arrangement, before the relative displacement, in the axial direction, of the outer cylinder relative to the inner cylinder is restricted by the abutment of the flange portion with the bracket, the vibration-proof member comes into abutment with the stopper member. As a result, the function of switching the spring constants is not impaired.

In the embodiment which is described hereinbelow, the above-described "axially limited portion" is defined to be the axially central portion, whereby the clearances are provided on both axial sides of the central portion. However, the "axially limited portion" may also be defined to be on both axial sides, and the clearance may be provided in the axially central portion.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
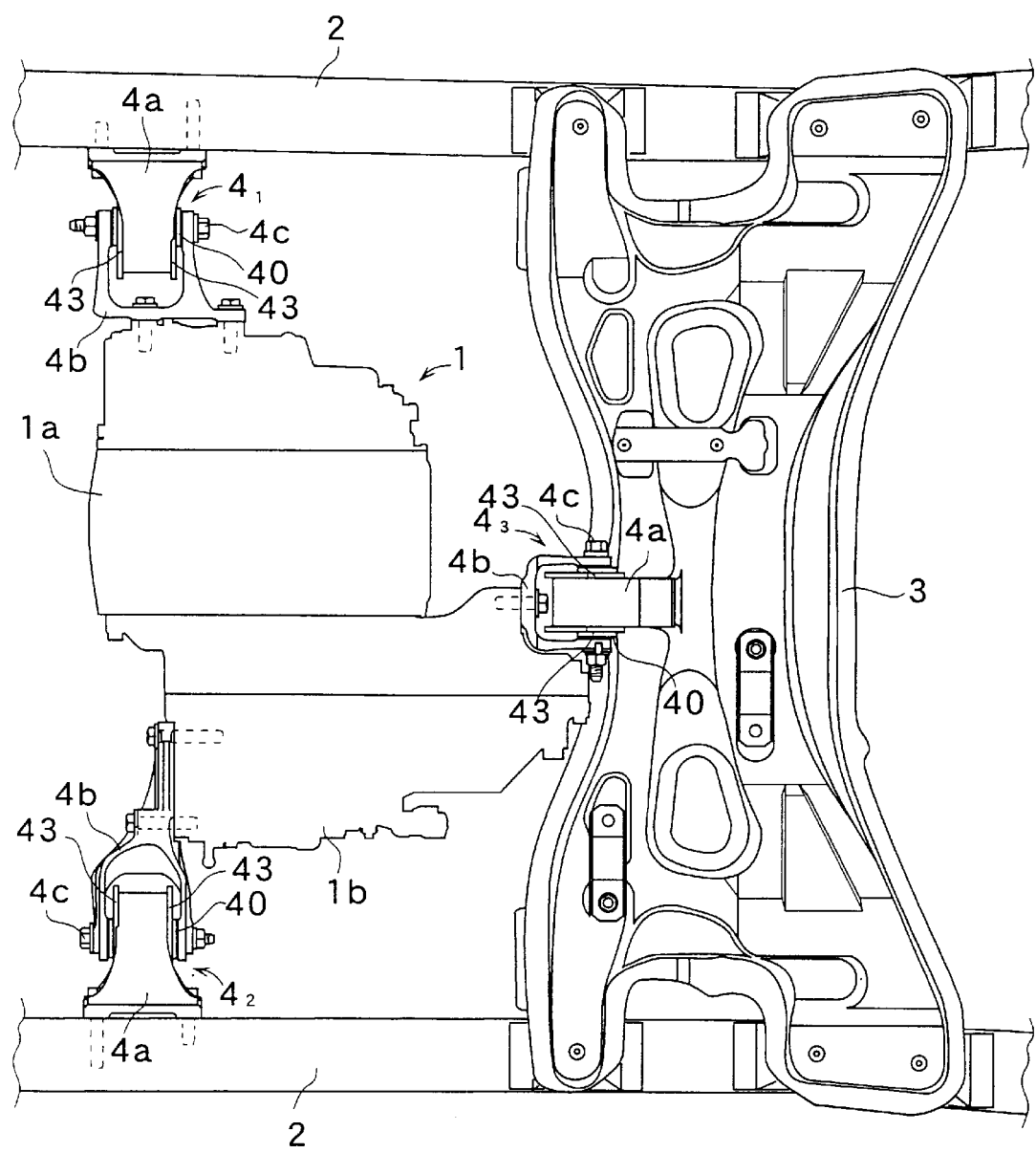
FIG. 1 is a plan view showing the position of disposing a driving source of an electric vehicle.

FIG. 1 shows that portion of an electric vehicle in which a driving source 1 is disposed. The driving source 1 is constituted by an electric motor 1a and a reduction gear 1b which is attached to one end of the electric motor 1a. The driving source 1 is supported on a vehicle body by means of three vibration-proof mounts $4_1$, $4_2$, $4_3$ which are respectively disposed on side frames 2, 2 on right and left sides of the vehicle body and on a cross beam 3 which is provided to bridge across both the side frames 2, 2.

Figure 2:
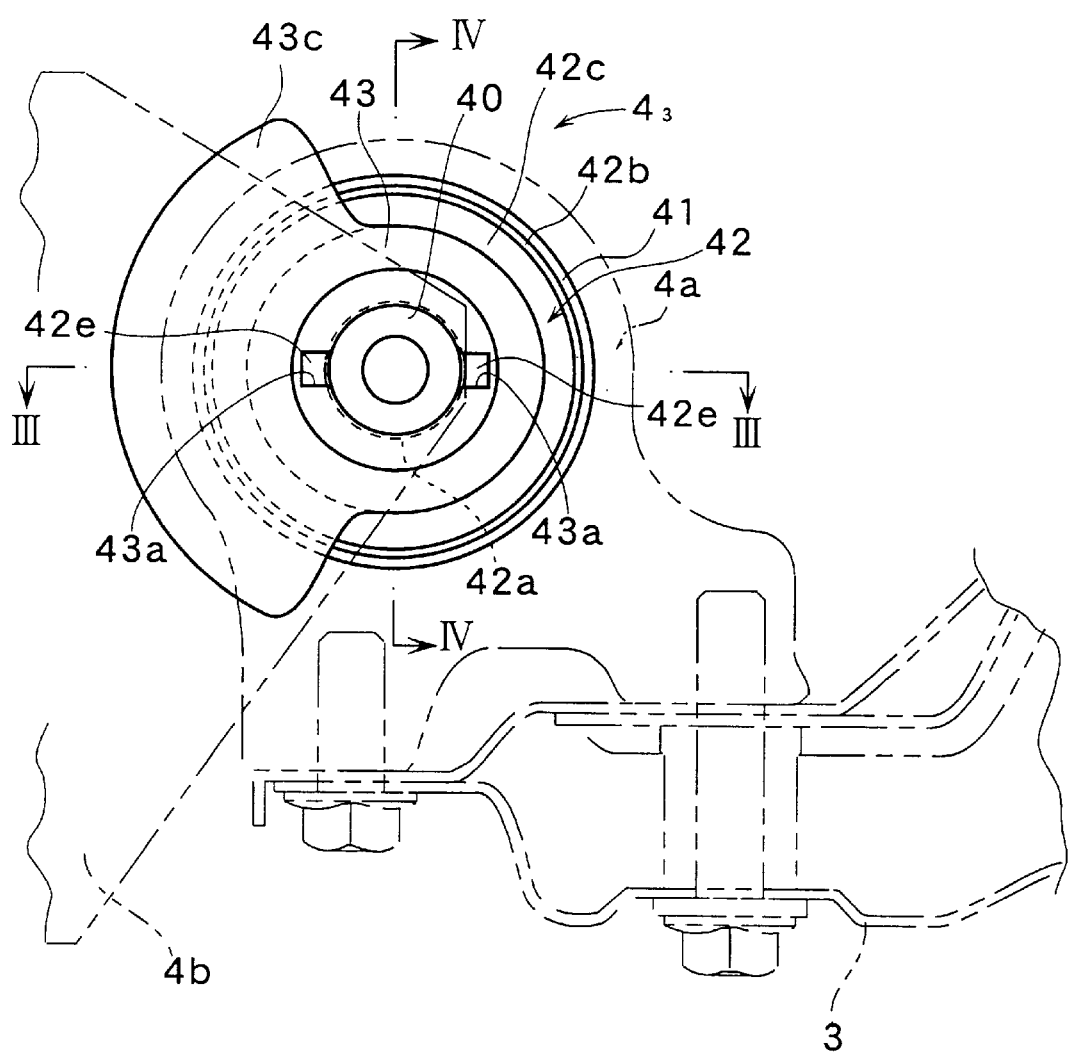
FIG. 2 is a side view of one example of a mount of the present invention which is used to support the driving source in FIG. 1.
Figure 3:
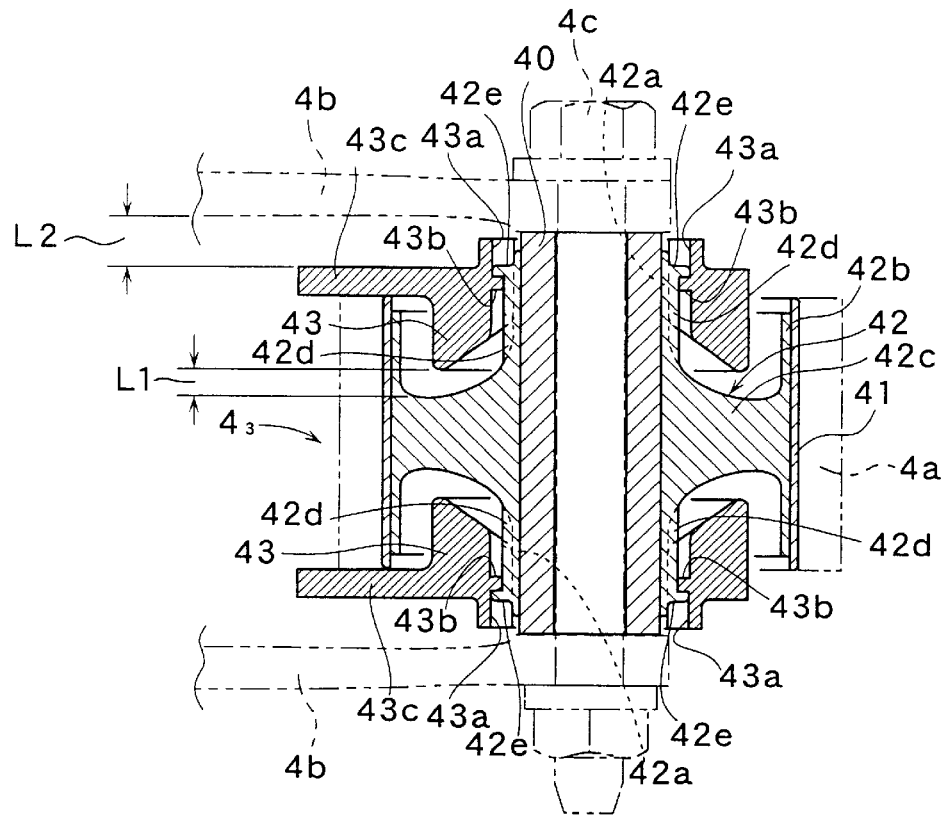
FIG. 3 is a sectional view taken along the line III—III in FIG. 2.
Figure 4:
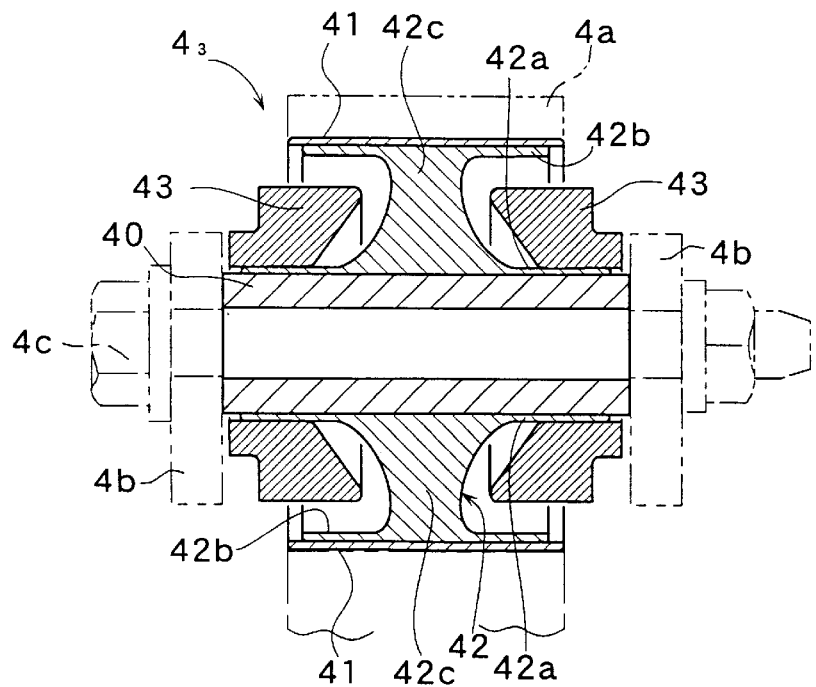
FIG. 4 is a sectional view taken along the line IV—IV in FIG. 2.

As shown in FIGS. 2 through 4, each of the vibration-proof mounts $4_1$, $4_2$, $4_3$ is provided with an inner cylinder 40, an outer cylinder 41, and a vibration-proof member 42 which is made of an elastic material such as rubber, or the like, and which connects the inner and the outer cylinders 40, 41. The outer cylinder 41 is fitted by force into a bracket 4a which is on the side of the vehicle body, and the inner cylinder 40 is pivotally mounted on a fork-shaped (or branched) bracket 4b which is on the side of the driving source 1 by means of a bolt 4c which penetrates, or passes through, the inner cylinder 40. The inner cylinder 40 is longer in axial length than the outer cylinder 41. The bracket 4b on the side of the driving source 1 is supported on the brackets 4a on the side of the vehicle body so as to be capable of relatively displacing in the diametrical direction and in the axial direction of the mount. The brackets 4a, 4b shown in FIGS. 2 through 4 are for use in the third vibration-proof mount 43.

The vibration-proof member 42 is made up of an integrally formed product which has: an inner collar portion 42a which is fixed to an outer circumference of the inner cylinder 40 by means of baking, adhesion or the like; an outer collar portion 42b which is fixed to an inner circumference of the outer cylinder 41 by means of baking, adhesion, or the like; and a solid annular main body portion 42c which connects both the inner collar portion 42a and the outer collar portion 42b in their axially intermediate portions. The main body portion 42c is formed into a disk shape whose axial width becomes smaller towards the diametrically outer end and is thus made to be deformable also in the axial direction.

By forming the main body portion 42c of the vibration-proof member 42 in the axially intermediate portions as described above, there will be formed, between the inner cylinder 40 and the outer cylinder 41, those spaces on both axial sides which are not filled with (or occupied by) the vibration-proof member 42. A pair of stopper members 43, 43 which are made of an elastic material such as rubber, or the like, are disposed in these spaces. Each of the stopper members 43 is formed into the shape of a cylinder which is fitted, with a light force, onto the outer circumferential surface of the inner collar portion 42a. The outer diameter of each of the stopper members 43 is made smaller than the inner diameter of the outer collar member 42b. It is thus so arranged that, when the amount of relative displacement in the diametrical direction between the inner cylinder 40 and the outer cylinder 41 has exceeded the difference in diameter between the inner diameter of the outer collar portion 42b and the outer diameter of the stopper member 43, each of the stopper members 43 is elastically deformed in the diametrical direction. It follows that, in a region in which the amount of relative displacement, in the diametrical direction, of the inner cylinder 40 and the outer cylinder 41 is small, only the main body portion 42c of the vibration-proof member 42 is elastically deformed in the diametrical direction, whereby the spring constant, in the diametrical direction, of the vibration-proof mount becomes small. In a region in which the amount of the above-described relative displacement is large, the main body portion 42c and the stopper member 43 are elastically deformed in the diametrical direction, whereby the spring constant, in the diametrical direction, of the vibration-proof mount becomes large.

Further, each of the stopper members 43 is disposed while leaving a space in the axial direction relative to that portion of the vibration-proof member 42 which connects the inner cylinder 40 and the outer cylinder 41, i.e., relative to the main body portion 42c. Therefore, there is no restriction to the enlargement in the axial direction of the main body portion 42c as a consequence of a compression thereof in the diametrical direction. It follows that the spring constant, in the diametrical direction, of the vibration-proof mount can be maintained small in the region in which the amount of relative displacement in the diametrical direction is small. The ability or performance of absorbing small vibrations can thus be improved. Further, in a region in which the amount of relative displacement, in the axial direction, of the inner cylinder 40 and the outer cylinder 41 is small, only the main body portion 42c is elastically deformed in the axial direction, whereby the spring constant of the vibration-proof mount in the axial direction becomes small. Once the amount of relative displacement has exceeded the axial width L1 of the above-described space, the main body portion 42c comes into abutment with the stopper member 43. As a result, the stopper member 43 also elastically deforms in the axial direction, and the spring constant, in the axial direction, of the vibration-proof mount becomes large. In this manner, the ability or performance to absorb small vibrations in the axial direction can be increased, and the large vibrations can also be effectively absorbed.

On an outer circumferential surface of the inner collar portion 42a, there are formed a pair of projections 42d, 42d on circumferentially opposite sides. On an inner circumferential surface of the stopper member 43, there are formed a pair of grooves 43a, 43a on circumferentially opposite sides. Each of the projections 42d is fitted into each of the grooves 43a to thereby prevent the stopper member 43 from rotating. Further, a claw portion 42e which projects radially outward is formed on an axially end portion of each of the projections 42d. A claw portion 43b which projects radially inward is formed inside each of the grooves 43a. The stopper member 43 is press-fitted or thrusted with a light force onto the inner collar portion 42a until the claw portion 43b goes inward beyond the claw portion 42e. The stopper member 43 is thus prevented from being pulled out of position in the axial direction.

Each of the stopper members 43 extends outward beyond the outer cylinder 41. In this extended portion, there is formed a flange portion 43c of a sector shape which restricts the depth of press-fitting of the stopper member 43 by bringing the flange portion 43c into abutment with the axially outer end of the outer cylinder 41. This flange portion 43c lies opposite, with a clearance, to the inner side of the bracket 4b on the side of the driving source, and serves as a stopper to prevent the bracket 4b on the side of the driving source from being subjected to an excessive displacement, in the axial direction of the vibration-proof mount, relative to the bracket 4a on the side of the vehicle body. However, in order to arrange that the main body portion 42c of the vibration-proof member 42 comes into abutment with the stopper member 43 before the relative displacement, in the axial direction, of both the brackets 4a, 4b is restricted by the abutment of the flange portion 43c with the bracket 4b on the side of the driving source, the axial width L2 of the clearance (also called "a second clearance") between the flange portion 43c and the bracket 4b is made larger than the axial width L1 of the clearance (also called "a first clearance") between the main body portion 42c and the stopper member 43.

In the above-described embodiment, the stopper member 43 is fitted on the side of the inner cylinder 40. The stopper member 43 may, however, be fitted on the side of the outer cylinder 41. Further, the stopper member 43 may be formed integrally with the vibration-proof member 42.

It is readily apparent that the above-described vibration-proof mount meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vibration-proof mount comprising:

an inner cylinder;

an outer cylinder;

a vibration-proof member for connecting said inner cylinder and said outer cylinder, said vibration-proof member being made of an elastic material;

wherein said vibration-proof member is formed in a shape to connect said inner cylinder and said outer cylinder in an axially limited portion such that a space is provided in an axially remaining portion between said inner cylinder and said outer cylinder;

a stopper member which is made of an elastic material, said stopper member being disposed in said space such that, when said inner cylinder and said outer cylinder have relatively displaced in a diametrical direction beyond a predetermined value, said stopper member is elastically deformed, and wherein said stopper member further comprises a flange portion which abuts an axial end of said outer cylinder, said flange being formed such that a second axial clearance is secured between said flange and a bracket which pivotally mounts said inner cylinder.

2. A vibration-proof mount comprising:

an inner cylinder;

an outer cylinder;

a vibration-proof member for connecting said inner cylinder and said outer cylinder, said vibration-proof member being made of an elastic material;

wherein said vibration-proof member is formed in a shape to connect said inner cylinder and said outer cylinder in an axially limited portion such that a space is provided in an axially remaining portion between said inner cylinder and said outer cylinder;

a stopper member which is made of an elastic material, said stopper member being disposed in said space such that, when said inner cylinder and said outer cylinder have relatively displaced in a diametrical direction beyond a predetermined value, said stopper member is elastically deformed, wherein a first axial clearance is secured between said stopper member and that portion of said vibration-proof member which connects said inner cylinder and said outer cylinder, and wherein said stopper member further comprises a flange portion which abuts an axial end of said outer cylinder, said flange being formed such that a second axial clearance of a width which is larger than an axial width of said first clearance is formed between said flange and a bracket which pivotally mounts said inner cylinder.

* * * * *